J. J. FARLING.
PROCESS FOR ANNEALING AND HARDENING GLASS.
APPLICATION FILED APR. 11, 1908.
928,860. Patented July 20, 1909.
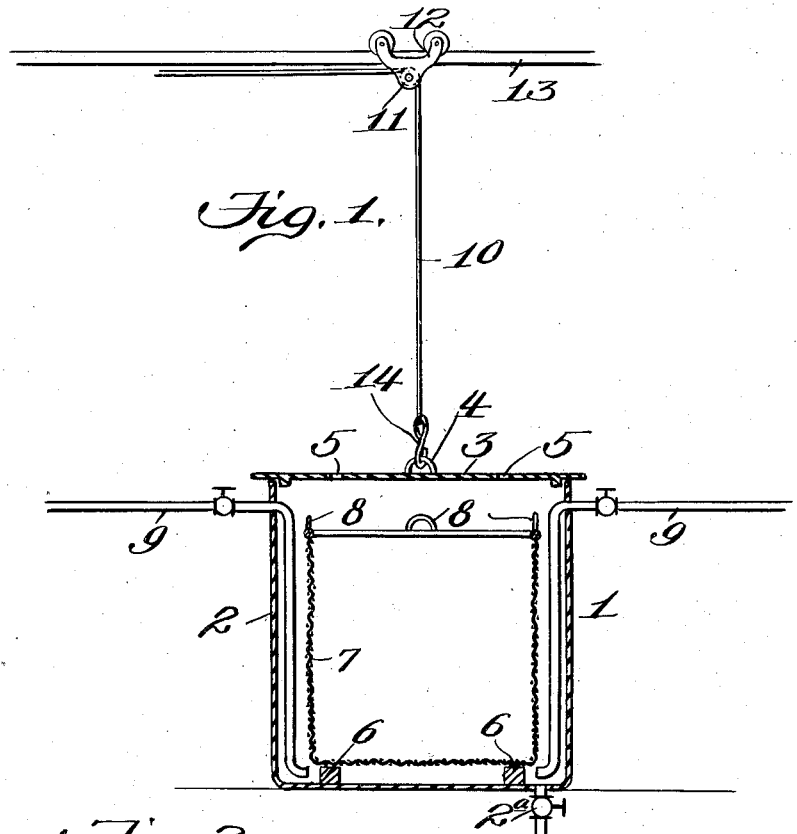
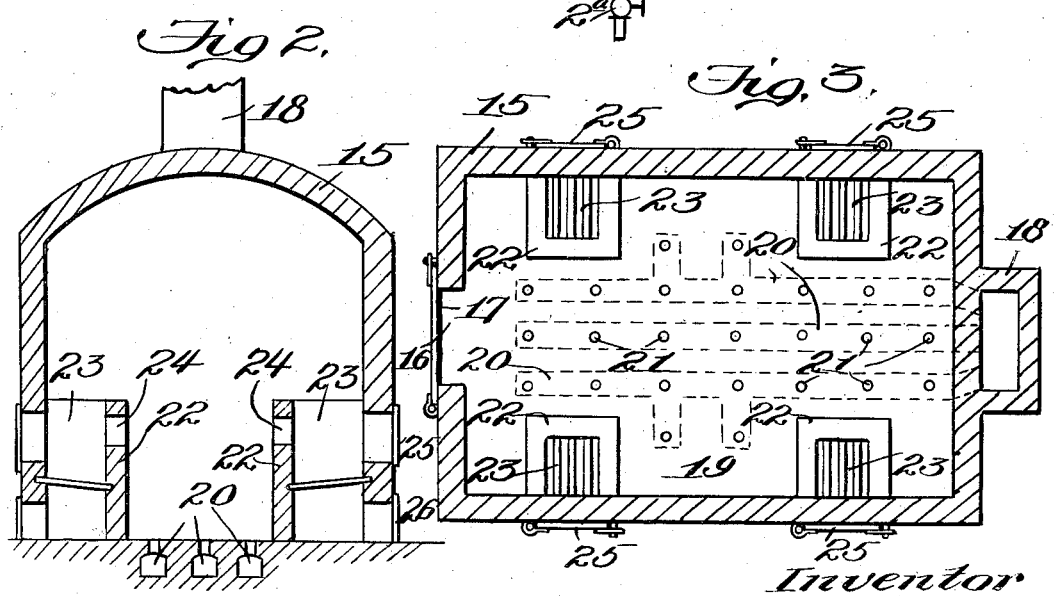

UNITED STATES PATENT OFFICE.

JOHN J. FARLING, OF BLUFFTON, INDIANA.

PROCESS FOR ANNEALING AND HARDENING GLASS.

No. 928,860.

Specification of Letters Patent.

Patented July 20, 1909.

Application filed April 11, 1908. Serial No. 426,518.

*To all whom it may concern:*

Be it known that I, JOHN J. FARLING, a citizen of the United States, residing at Bluffton, in the county of Wells and State of Indiana, have invented new and useful Improvements in Processes of Annealing and Hardening Glass, of which the following is a specification.

This invention relates to a process of annealing and hardening window and analogous glass and the primary object of the same is to simplify and cheapen processes of annealing and hardening glass to render the latter commercially economical particularly in uses or applications where a large quantity of glass having superior wearing qualities and increased hardness is demanded, as for example in greenhouse structures.

A further object of the invention is to anneal and harden glass in such manner that a greater homogeneity is imparted to the same and which enables it to resist considerable changes of temperature without being liable to crack or break and also which will resist fracturing blows or shocks.

A still further object of the invention is to utilize simple steps and inexpensive materials in carrying out the process.

The invention consists in the several steps and substances used in carrying out the process and which will be more fully hereinafter specified.

The accompanying drawings show one form of an apparatus which may be used in carrying out the process, but it will be understood that the apparatus may be varied within the scope of the invention.

In the drawing: Figure 1 is a diagrammatic view showing a vat partially in section and a conveying means therefor. Fig. 2 is a transverse vertical section of a kiln in which a part of the process is carried out. Fig. 3 is a horizontal section of the kiln.

Similar characters of reference are employed to indicate corresponding parts in the several views.

The numeral 1 designates a vat comprising an outer steel tank 2 having a suitable cover 3, preferably of iron, and provided with a central eye or ring 4 and a plurality of vent openings 5. The cover 3 is separably secured to the tank 2 by any suitable means adapted for the purpose. The tank 2 has blocks or ledge devices 6 of metal disposed therein and resting on the bottom to support an inside tank 7 of materially less diameter than the said outside tank 2 and constructed of perforated steel, the perforations extending fully throughout the side and bottom. The top of the inside tank 7 is fully open and has a series of eyes 8 secured to the rim for the attachment of chains or analogous devices not shown, by which the inside tank may be lifted from or disposed in the outside tank. Valved steam pipes of suitable construction, as at 9, extend into the upper portion of the outside tank 2 at diametrically opposite points and have their lower ends terminating close to the bottom of the said outside tank so that when steam is turned on or passes through the pipes it is delivered at the bottom of the outside tank and will circulate upwardly and under, as well as over, the inside tank 7 and thus effectively heat the vat. The outside tank has a suitable drain cock $2^a$.

The means adopted for elevating the inside tank 7 or withdrawing the latter from and inserting it in the outside tank 2 consists of a rope or cable 10 depending from a pulley 11 held by a carrier 12 movable over a suitably supported eye-beam tramway rail 13, the rope or cable 10 having a terminal hook 14 to engage the devices connected to the eyes 8 of the inside tank.

By means of the traveling suspending devices just explained the inside tank may be conveyed toward and from the outside tank any distance, and it will be understood that the steam pipes 9 may be connected up with any suitable source of steam supply.

The apparatus also comprises a dry kiln 15 formed of suitable material and having an entrance opening 16 at one end provided with a door 17, a stack 18 being located at the end of a kiln opposite that having the opening 16 therein and leading down to and communicating with the floor 19 which has a plurality of longitudinal flues or ducts 20 extending therethrough and communicating with the lower extremity of the said stack 18. Openings 21 establish communication between the interior of the kiln and the flues or ducts 20, said openings being disposed at regular intervals in the floor 19 and serving as the sole means for the escape of the products of combustion and heat currents from the interior of the kiln to the stack and thus creating a down draft, the products of combustion and heat currents first rising to the top of the kiln and then drawn downwardly through the openings 21. Interior walls 22 rise vertically within the kiln and are spaced from each other a suitable distance, the said walls extending only partially upwardly through the kiln and providing the inner terminal walls of a plurality of furnaces or fire-places 23 fully open at the top so that the products of combustion and heat currents may pass outwardly therefrom and into the kiln at points above the floor 19, the walls 22 also having openings 24 therein near their upper edges for establishing lateral escape of the heat currents into the space between the walls 22. The furnaces or fire-places 23 have exteriorly accessible fuel and ash pit doors 25 and 26 at the opposite sides.

The glass to be treated is disposed in the vat 1, the latter first having a solution placed therein and consisting of saltpeter, common salt or sodium chlorid, and wood lye, the wood lye being preferably made from wood ashes. The proportions of each of the foregoing ingredients found best adapted for the purpose are, one part of saltpeter, two parts of ordinary salt or sodium chlorid, and one part of wood lye. These ingredients are dissolved in a quantity of water sufficient to nearly fill the outside tank 2. The glass to be treated is then placed in the inside perforated tank 7 and through the medium of the cable or rope 10 and the carrier 12 the said inside tank is conveyed in suspended position to and over the outside tank 2 and lowered into the latter tank and fully submerged in the solution just specified. Steam is then admitted to the vat subsequent to closing the latter with the cover 3 and a thorough circulation of the solution is set up and the boiling point of said solution is established and continued for about forty-eight hours, the heated solution during such period flowing over and around and under the inside tank, the steam escaping through the vent openings 5 to the outside air. The foregoing ingredients used in the preliminary treatment of the glass and comprising saltpeter, salt, and wood lye in or about the proportions mentioned operate conjointly to deprive the glass of its brittleness, or the temper of the glass is drawn, and at the same time to render it tenacious, each of the ingredients contributing to this result, the saltpeter and the salt first depriving the glass of its brittleness and the wood lye directly acting on the glass to render it tenacious. In other words, the glass as thus treated, is resolved into a better receptive condition for the second treatment which will now be explained. The glass is removed from the vat through the suspending and conveying means and is then subjected to a second treatment as follows: Between the plates or pieces of glass a composition is placed consisting of two parts of slaked lime, either water or air slaked, one part of chlorid of lime, one part of saltpeter, one part of ordinary salt or sodium chlorid, and one part of pulverized alum. After these mixed ingredients have been disposed between the plates or pieces of glass the latter are introduced into the kiln 15 and properly stacked or arranged endwise to the best advantage on the bottom or floor 19 of the kiln between the openings 21 so that the heat currents and products of combustion may circulate freely around the glass. The furnaces 23 are then started up and a degree of heat is maintained within the kiln at a temperature below the melting point of glass, this dry heating of the glass with the composition between the plates or pieces thereof being continued for about six days. By this second treatment the glass is hardened and becomes more nearly like metal or similar to sheet iron, and it will be found to be elastic and capable of bending without breaking and thus will withstand a greater fracturing force or blow than ordinary glass. In this second treatment the heat causes the glass to become softened, thus permitting the ingredients used in such treatment to affect the same or render the glass elastic when the glass is cool and hardens, the glass being given more of a water color by this second treatment. The two kinds of lime, saltpeter, salt and alum in or about the proportions mentioned in this second treatment, all contribute to the second result thus specified. The glass is removed from the kiln and allowed to cool and then subjected to a third treatment as follows: The cooled glass is then washed in a solution composed of water and sulfuric acid, two parts of water to one part of sulfuric acid being used and each plate or piece being carefully and thoroughly cleansed in this solution to remove all foreign substances from the glass. After the glass has been passed through or treated in the solution of water and sulfuric acid just mentioned it will be found to be clean and its luster restored.

If the foregoing steps and compositions be carefully followed the glass subjected to treatment as explained will become annealed and hardened and may be used for any purpose desired. If a test be made of the hardness of the glass thus treated it will be found that it will not break if thrown on a resisting surface with ordinary force, and may also be hammered without liability of fracture.

Glass treated in accordance with the foregoing process will be found exceptionally advantageous for use in greenhouses as well as ordinary window glass service or plate glass.

Having thus fully described the invention, what is claimed as new, is:

1. The herein described process of annealing and hardening glass consisting in submerging the glass in a solution of water, saltpeter, common salt and wood lye and heating such solution to the boiling point, subsequently disposing slaked lime, chlorid of lime, salt, saltpeter and pulverized alum between the pieces of glass and then subjecting the latter to a dry heat.

2. The herein described process of annealing and hardening glass consisting in submerging the glass in a solution of water, saltpeter, common salt and wood lye and heating such solution to the boiling point, subsequently disposing slaked lime, chlorid of lime, salt, saltpeter and pulverized alum between the pieces of glass and then subjecting the latter to a dry heat, and finally subjecting the glass when cooled to a cleansing operation in a solution of water and sulfuric acid.

3. The herein described process of annealing and hardening glass consisting in submerging the glass in a toughening solution and heating such solution to the boiling point, drying the glass and subjecting it to the heat of a dry kiln and the action of a hardening composition between the pieces thereof while under the influence of the heat of the kiln, and finally cleaning the glass and restoring its luster.

In testimony whereof I have hereunto set my hand in presence of two subscribing witnesses.

JOHN J. FARLING.

Witnesses:
LEVI MOCK,
JOHN MOCK.